United States Patent [19]
Mathis

[11] 4,174,134
[45] Nov. 13, 1979

[54] VEHICLE COVER ASSEMBLY

[76] Inventor: Joseph S. Mathis, Rt. 3, Box 315, Cantonment, Fla. 32533

[21] Appl. No.: 855,824

[22] Filed: Nov. 30, 1977

[51] Int. Cl.² .............................................. B60J 7/20
[52] U.S. Cl. .................................... 296/136; 296/143
[58] Field of Search ........... 296/137 R, 137 E, 137 G, 296/136, 140, 141, 143

[56] References Cited
U.S. PATENT DOCUMENTS

| | | | |
|---|---|---|---|
| 603,512 | 5/1898 | Rosbrook et al. | 296/140 |
| 1,102,921 | 7/1914 | Hodge | 296/143 X |
| 1,623,934 | 4/1927 | Bourgon | 296/143 |

Primary Examiner—Joseph F. Peters, Jr.
Assistant Examiner—Norman L. Stack, Jr.
Attorney, Agent, or Firm—C. Emmett Pugh & Associates

[57] ABSTRACT

A vehicle cover assembly including a housing disposed adjacent a passenger compartment of a vehicle, a roller disposed in the housing, a flexible shade disposed on the roller, conveyor wheels attached to the roller at either end thereof, conveyor lines mounted on the conveyor wheels, the shade being connected to the conveyor lines, brackets mounted on upper exterior portions of the passenger compartment and adjacent the passenger compartment at an end thereof remote from the housing, conveyor spools mounted on the brackets and having the conveyor lines mounted thereon; the shade may be moved out of the housing and along the conveyor lines to the passenger compartment end remote from the housing to cover the passenger compartment at the top and either end thereof. The intermediate brackets are preferably mounted on the rain gutters (note FIG. 2) of the vehicle.

5 Claims, 5 Drawing Figures

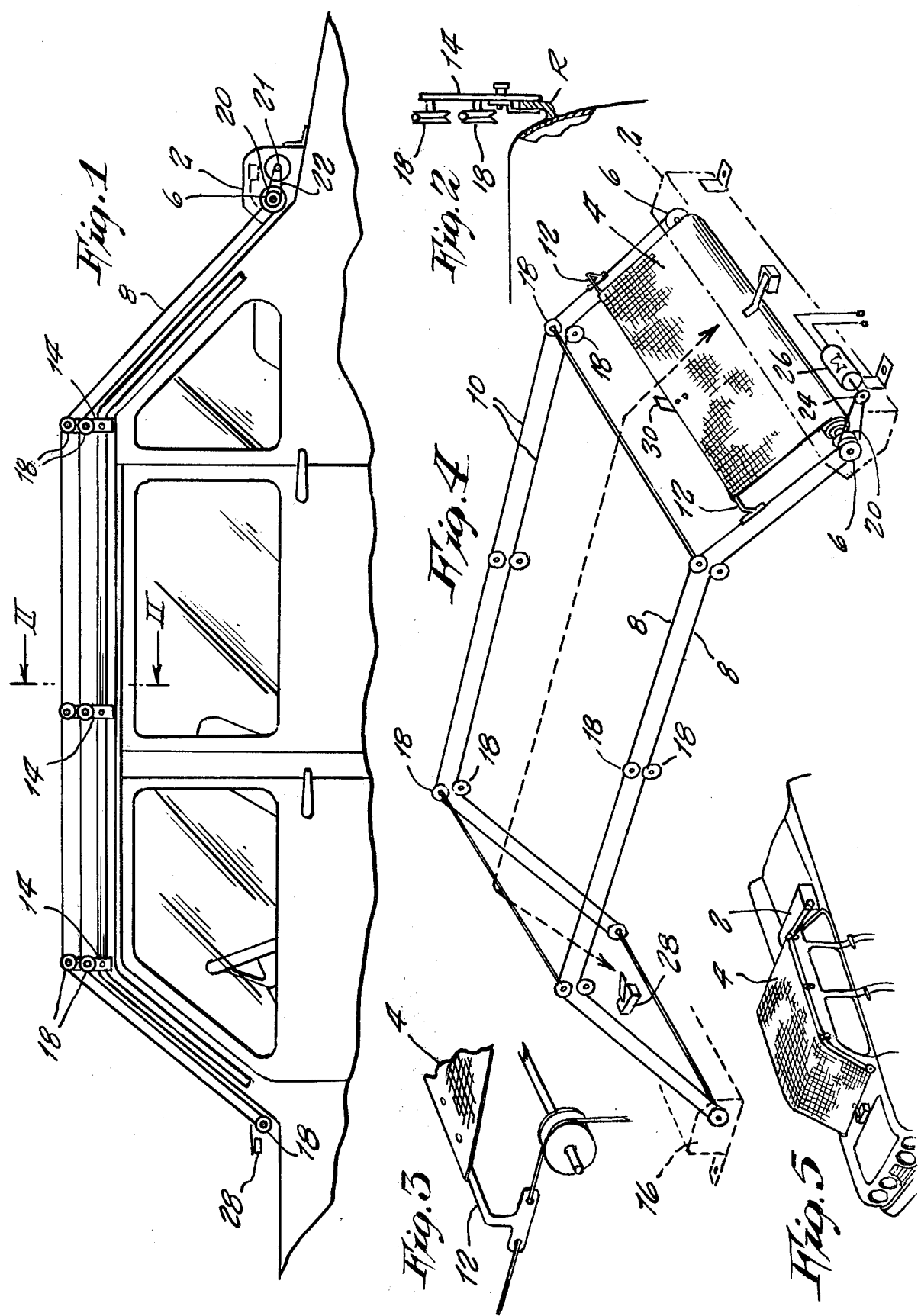

VEHICLE COVER ASSEMBLY

BACKGROUND OF THE INVENTION

1. Field of the Invention

This invention relates to sun protectors for vehicles and is directed more particularly to a cover assembly for attachment to a vehicle.

2. Description of the Prior Art

Cover assemblies for vehicles are generally known in the art. Examples of various such devices may be seen in U.S. Pat. Nos. 2,608,942, issued Sept. 2, 1952 to R. E. Smith; No. 2,609,042, issued Sept. 2, 1952 to J. C. Chamberlain; No. 2,849,012, issued Aug. 26, 1958 to M. Cohen, et al.; No. 2,874,709, issued Feb. 24, 1959 to M. Cohen, et al.; No. 2,995,137, issued Aug. 8, 1961 to W. F. Cothern; No. 3,050,070, issued Aug. 21, 1962 to R. Kaplan, et al.; No. 3,143,123, issued Aug. 4, 1964 to F. C. Boor; No. 3,343,556, issued Sept. 26, 1967 to P. Stamberger, et al.; and No. 3,876,245, issued Apr. 8, 1975 to J. I. Lowery.

SUMMARY OF THE INVENTION

An object of the present invention is to provide a vehicle cover assembly which may be permanently connected to a vehicle and operative to cover the passenger compartment of the vehicle with a shade for protection against the sun.

With the above and other objects in view, as will hereinafter appear, a feature of the present invention is the provision of a vehicle cover assembly comprising a housing disposed adjacent a first end of a passenger compartment of a vehicle, a roller disposed in the housing, a flexible shade disposed on the roller, conveyor wheels attached to the roller at either end thereof, conveyor lines mounted on the wheels, the shade being connected to the conveyor lines, bracket means mounted on upper exterior portions of the passenger compartment and adjacent the passenger compartment at a second end thereof, conveyor spools mounted on the bracket means and having the conveyor lines mounted thereon, whereby the shade may be moved out of the housing and along the conveyor lines to the passenger compartment second end to cover the passenger compartment at the top and either end thereof.

The above and other features of the invention, including various novel details of construction and combinations of parts, will now be more particularly described with reference to the accompanying drawings and pointed out in the claims. It will be understood that the particular devide embodying the invention is shown by way of illustration only and not as a limitation of the invention. The principles and features of this invention may be employed in various and numerous embodiments without departing from the scope of the invention.

DESCRIPTION OF THE DRAWINGS

Reference is made to the accompanying drawings in which is shown an illustrative embodiment of the invention from which its novel features and advantages will be apparent.

FIG. 1 is a side elevational view of one form of vehicle cover assembly illustrative of an embodiment of the invention;

FIG. 2 is an end elevational view of a portion of the invention;

FIG. 3 is a perspective view of another portion of the invention;

FIG. 4 is a perspective view of the assembly shown in FIG. 1; and

FIG. 5 is a perspective view of the assembly shown covering the passenger compartment of a vehicle.

DESCRIPTION OF THE PREFERRED EMBODIMENT

Referring to the drawings, it will be seen that the illustrative assembly includes a housing 2 disposed adjacent a first end of a passenger compartment of a vehicle. As can be seen in the drawings, the vehicle is a standard enclosed type having a hard, rigid roof with side rigid windows with rain gutters R (note FIG. 2) along its sides at its roof line above the windows.

A roller is disposed in the housing 2 and has a flexible shade 4 disposed thereon. Conveyor wheels 6 are attached to the roller at either end thereof. Conveyor lines 8, 10 are mounted on the wheels 6. A bar 12 extends from the conveyor line 8 to the conveyor line 10 and has attached thereto an edge of the shade 4, as may be seen in FIG. 3.

Intermediate bracket means 14 are mounted on upper exterior portions of the passenger compartment and further, end bracket means 16, which may take the form of a second housing, as shown in phantom in FIG. 4, are disposed adjacent the passenger compartment at a second end thereof. Each of the bracket means 14, 16 are provided with conveyor spools 18 having the conveyor lines 8, 10 mounted thereon.

A drive wheel 20 is connected to the shade roller and has mounted thereon a drive belt 22 which is further mounted on a second drive wheel 24 which is connected to an electrical motor 26. The motor 26 may be connected to switch means in the driver's compartment proximate to the driver's station. The motor 26 is operative to rotate the conveyor wheels 6 and simultaneously the drive wheel 20 to cause rotation of the shade roller and movement of the conveyor lines 8, 10 to pull the bar 12, and thereby the shade 4 along the conveyor lines to cover the passenger compartment.

Preferably, the bracket means 14 comprise bracket members positioned on either side of the top portion of the vehicle, as shown in the drawings, each of the brackets 14 supporting a pair of the conveyor spools 18, as shown in FIG. 2. A lock means 28 is provided at the second end of the passenger compartment for purposes of locking the shade in the position in which it fully covers the passenger compartment (FIG. 5).

Referring to FIG. 2, it is preferred that the brackets 14 be fixed to a rain gutter portion R of the vehicle. Obviously, the brackets 14 may be attached to the vehicle in any number of known ways.

In use, an operator of the vehicle closes a switch at the vehicle driver's station to energize the motor 26 whereby to cause rotation of the shade roller and movement of the conveyor lines 8, 10 to pull the shade over the top of the vehicle and downwardly over the second end to a point where the locking means 28 may engage a complementary locking means 30 on the shade to lock the shade in the position shown in FIG. 5. To remove the cover from the passenger compartment, it is necessary only that the locking means 28, 30 be released and the aforesaid switch be thrown to energize the motor 26 to rotate the drive wheel 20 and conveyor wheels 6 in the opposite direction to draw the shade 4 back into the housing 2.

It is to be understood that the present invention is by no means limited to the particular construction herein disclosed and/or shown in the drawings, but also comprises any modifications or equivalents within the scope of the disclosure

Having thus described my invention what I claim as new and desire to secure by Letters Patent of the United States is:

1. A vehicle cover assembly comprising a housing disposed adjacent a first end of a enclosed passenger compartment of a vehicle having a hard, rigid roof with side rigid windows with rain gutters along its sides at its roofline above the windows, a roller disposed in said housing, a flexible shade disposed on said roller, conveyor wheels attached to said roller at either end thereof, conveyor lines mounted on said wheels, said shade being connected to said conveyor lines, intermediate bracket means mounted on upper, exterior portions of the passenger compartment to the rain gutters of the vehicle and end bracket means mounted adjacent the passenger compartment at a second end thereof, conveyor spools mounted on each said bracket means and having said conveyor lines mounted thereon, said shade being movable out of said housing and along said conveyor lines over and above the roof of the vehicle to the passenger compartment second end to cover the passenger compartment at the top and either end thereof.

2. The invention according to claim 1 including first drive wheel means connected to said roller, motor means having second drive wheel means thereon, and drive means interconnecting said first and second drive wheel means, operation of said motor being thereby operative to rotate said roller and said conveyor wheels whereby to move said shade.

3. The invention according to claim 1 in which said intermediate bracket means mounted on upper portions of said passenger compartment comprise a plurality of brackets mounted on either side of said vehicle, each of said brackets having a pair of said conveyor spools thereon, in each pair a first of said spools being disposed above a second of said spools.

4. The invention according to claim 3 including a bar extending from a first of said conveyor lines to a second of said conveyor lines, an edge of said shade being fixed to said bar.

5. The invention according to claim 4 including lock means for fastening said shade in place when it is covering said passenger compartment at the top and either end thereof.

* * * * *